(12) United States Patent
Ohkubo et al.

(10) Patent No.: US 6,490,930 B1
(45) Date of Patent: Dec. 10, 2002

(54) HUMAN BODY VIBRATION EVALUATION DEVICE AND HAND-HELD VIBRATION TOOL

(75) Inventors: Masaaki Ohkubo, Osaka (JP); Setsuo Maeda, Osaka (JP)

(73) Assignee: Fuji Air Tools Co., Ltd., Osaka (JP)

( * ) Notice: Subject to any disclaimer, the term of this patent is extended or adjusted under 35 U.S.C. 154(b) by 0 days.

(21) Appl. No.: 09/600,989
(22) PCT Filed: Nov. 25, 1998
(86) PCT No.: PCT/JP98/05298
§ 371 (c)(1), (2), (4) Date: Jul. 25, 2000
(87) PCT Pub. No.: WO00/31505
PCT Pub. Date: Jun. 2, 2000

(51) Int. Cl.$^7$ .............................................. G01H 11/00
(52) U.S. Cl. ........................... 73/661; 73/570; 73/865.3
(58) Field of Search ................... 73/661, 570, 432.1, 73/865.3, 865.9, DIG. 1

(56) References Cited

U.S. PATENT DOCUMENTS 4,656,868 A * 4/1987 Azuma et al. ................ 73/487
5,897,606 A * 4/1999 Miura et al. .................. 702/56
6,032,552 A * 3/2000 Alleai .......................... 74/574
6,035,720 A * 3/2000 Podszun et al. ............. 73/669
6,271,760 B1 * 8/2001 Watanabe et al. .......... 340/667

* cited by examiner

Primary Examiner—Hezron Williams
Assistant Examiner—Jacques Saint-Surin
(74) Attorney, Agent, or Firm—Darby & Darby

(57) ABSTRACT

A three-axis vibration acceleration pickup with the handle of a vibration-generating tool such as, an angle grinder or the like, feeds detected vibrations along the three axes to an A/D converter 19. A microcomputer processes the digitized data to feed a display portion. Each time continuous operation of the tool is interrupted, an 8-hour equivalent acceleration value is obtained based on the detected vibration acceleration signal. The result is added to previous acceleration values so as to accumulatively add up the total value in one day. Each time continuous operation is interrupted, a frequency load vibration acceleration value is obtained, and an 8-hour equivalent acceleration value is obtained based on this. A residual surplus time is obtained and displayed by using the 8-hour equivalent acceleration value.

7 Claims, 4 Drawing Sheets

HUMAN BODY VIBRATION EVALUATION DEVICE AND HAND-HELD VIBRATION TOOL

DETAILED DESCRIPTION OF THE INVENTION

1. Field of the Invention

The present invention relates to a human body vibration evaluating apparatus and a holding vibration tool which detects, analyzes and displays the vibrations to be received by the human body.

2. Background of the Invention

A holding vibration tool such as chipping hammer, grinder, impact wrench or the like transmits the vibrations from the vibration source to the hand and arm of the user. In an automobile, a bike, an electric train, and so on, the vibrations from the vibration source are transmitted to the whole body of the user.

When the hand and arm vibrations, and the whole body vibrations are applied upon the human body excessively, it is known that various influences are affected upon the user's health and comfort. Nowadays, consciousness about the safety of the product are higher. The safety of an apparatus such as tool to be used by the person becomes a first requirement as the quality of the product. The influence to be given by the vibrations to the body of the operator or the like is one of the most important items, which demands measures on the operation spot and so on. Thus, in recent years, the relationship between the vibration exposure amount and the body influences is actively investigated. If the vibration exposure amount is limited to a specified value or less, it is found out that the health of the users of the holding vibration tool can be sufficiently retained. The ISO (International Standardization Organization), Japanese Industry Sanitation Society and so on are producing the norms of the vibration measurement and the vibration evaluation, and the guidelines on the hand and arm. The health and safety of the users of the vibration tool are retained based on such norms and the guidelines.

The vibration exposure amounts received by the operators could be evaluated only when a constant operation was continued even if such norms and guidelines as described above was used. In the actual operations which variably changed in contents of the operations even in one day, the correct grasping operation could not be always understood sufficiently as to how much the vibration exposure received by the operators up to the actual time point was applied. Thus, there is no telling how much operations can be continued, now that the correct time cannot be grasped.

Accordingly, this invention can correctly evaluate the vibrations added to the human body in the actual operations, whereby the human body can be positively protected from the vibrations applied on the human body.

DISCLOSURE OF THE INVENTION

A human body vibration evaluating apparatus comprises a vibration detecting means 13 for detecting the vibrations to be added to the human body, an analyzing means 20 for analyzing based on signals detected by the vibration detecting means 13, a displaying means 11 for displaying based on the analyzing results grasped by the analyzing means 20, is characterized in that the analyzing means 20 grasps an 8-hour equivalent acceleration value $ahw_{(eq\cdot 8h)}$ about the vibrations detected continuously each time the vibrations detected continuously by the vibration detecting means 13 are interrupted, and the total 8-hour equivalent acceleration value $ahw_{(eq\cdot 8h)}$ up to the present time point by the accumulatively adding the 8-hour equivalent acceleration value $ahw_{(eq\cdot 8h)}$ in one day.

In the human body vibration evaluating apparatus described above, the 8-hour equivalent acceleration value of the vibrations continued is grasped each time the continued vibrations are interrupted, and it is added accumulatively within one day. Accordingly, even when the contents of the operations are variably changed within one day, the vibrations added to the human body can be evaluated correctly.

A human body vibration evaluating apparatus alternatively comprises a vibration detecting means 13 for detecting the vibrations to be added to the human body, an analyzing means 20 for analyzing based on signals detected by the vibration detecting means 13, a displaying means 11 for displaying based on the analyzing results grasped by the analyzing means 20, is characterized in that the analyzing means 20 grasps a frequency load vibration acceleration effective value $ahw_{(eq\cdot 8h)}$ about the vibrations detected continuously each time the vibrations detected continuously by the vibration detecting means 13 are interrupted, the limit time $t_g$ where the 8-hour equivalent acceleration value $ahw_{(eq\cdot 8h)}$ becomes a specified reference value when the vibrations are to continue is grasped by the frequency load vibration acceleration effective value $ahw$, and the residual surplus time $t_p$ is grasped by subtracting the total time, where the vibration is detected by the vibration detecting means 13 up to the present time point within one day, from the limit time $t_g$.

In the human body vibration evaluating apparatus described above, the frequency load vibration acceleration effective value $ahw$ of the continued vibrations is grasped each time the continued vibrations are interrupted, the limit time $t_g$ where the 8-hour equivalent acceleration value $ahw_{(eq\cdot 8h)}$ becomes the specified reference value by using the frequency load vibration acceleration effective value $ahw$ is grasped, and the residual surplus time $t_p$ is grasped by using the limit time $t_g$. Accordingly, even when the contents of the operation are variably changed within one day, the vibrations added to the human body can be evaluated correctly, making it possible to correctly grasp how much the operation and so on can be effected continuously.

A human body vibration evaluating apparatus of the present invention, can be mounted in an apparatus for giving vibrations to the human body, of an automobile or a holding vibration tool or the like.

In the human body vibration evaluating apparatus described above, the human body can be protected positively from the vibrations to be added to the human body in an apparatus which gives vibrations to the human body, of an automobile or the holding vibration tool or the like.

A holding vibration tool includes a human body vibration evaluating apparatus of the above discussion.

According to the holding vibration tool claimed, the operator himself can easily grasp the correct evaluation of the vibrations to be added to the operator up to the actual time point in the actual operation.

A holding vibration tool is claimed, where the vibration detecting means 13 is provided in a handle portion 2.

In a holding vibration tool is also claimed, where the vibrations can be evaluated more correctly.

A holding vibration tool is also claimed, where the human body vibration evaluating apparatus is provided in a handle 2.

PREFERRED EMBODIMENT OF THE INVENTION

A concrete embodiment of a human body vibration evaluating apparatus and a holding vibration tool of this invention will be described in detail with reference to the drawings.

Figure 1:
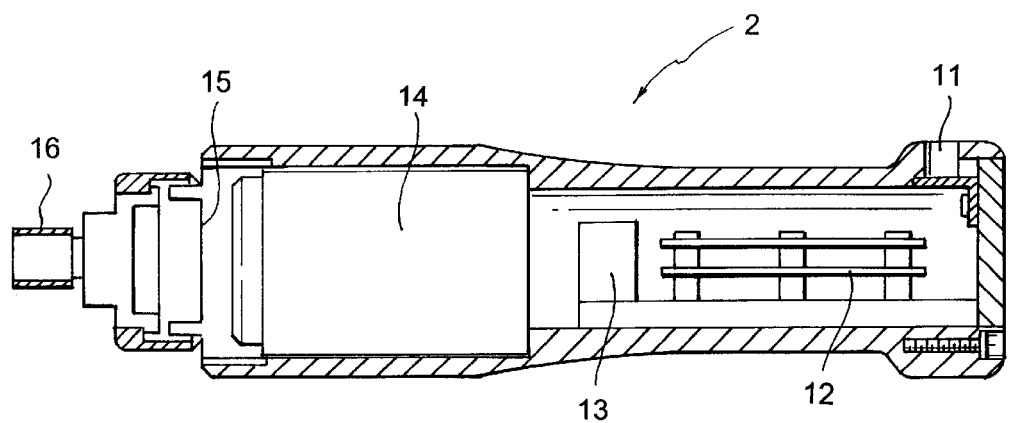
FIG. 1 is a sectional view showing the interior of the handle portion of an angle grinder in one embodiment of this invention.
Figure 2:
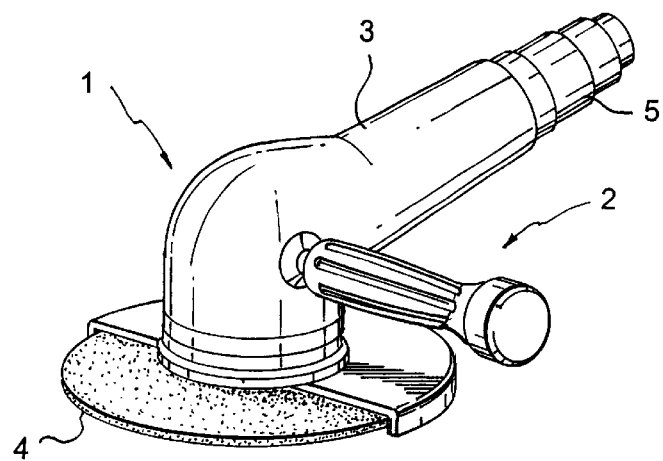
FIG. 2 is a perspective view showing the angle grinder.

FIG. 2 is a perspective view showing an angle grinder 1 which is one type of the holding vibration tool. The angle grinder 1 is comprised of a drive mechanism accommodating portion 3 of a bent shape with an air motor and so on being accommodated therein, a grindstone portion 4, a handle portion 2 to be grasped by an operator, and a hose connecting portion 5 for connecting the air hose. FIG. 1 is a sectional view showing the inner portion of the handle portion 2 of the angle grinder 1. In the inner portion of the handle portion 2 are provided a three-axis vibration acceleration pickup 13, a control substrate 12 with a microcomputer 20 (see FIG. 3) and so on being embodied in it, a display portion 11 using, for example, a liquid crystal display element, and a battery 14 for feeding power to them. To the basic end portion of the handle portion 2 is provided a coupling 16 to the drive mechanism accommodating portion 3, and a vibration preventing rubber 15 for reducing the vibration to be transmitted to the handle portion 2 from the drive mechanism accommodating portion 3.

Figure 3:
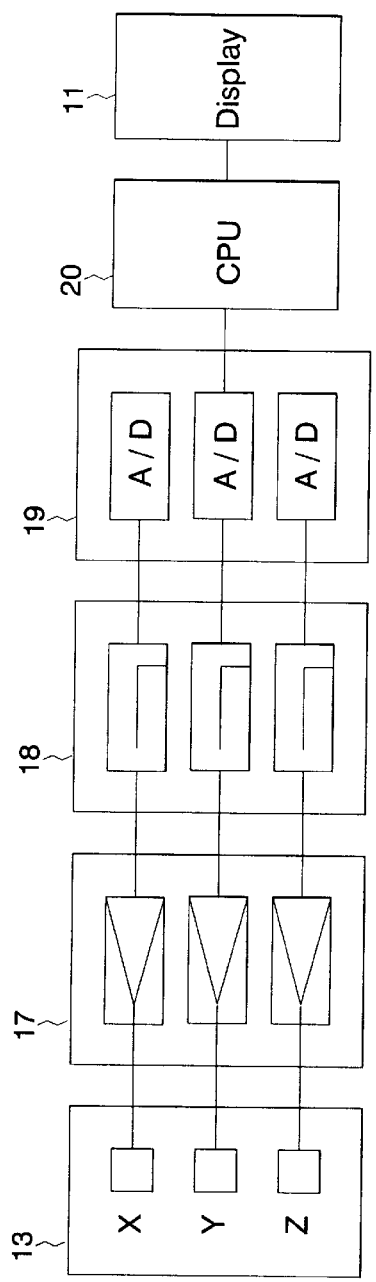
FIG. 3 is a block diagram showing the human body vibration evaluating apparatus mounted in the angle grinder.

FIG. 3 is a block diagram showing a system for displaying in accordance with the vibration exposure amount by grasping the vibration exposure amount of the operator. This system, equivalent to a human body vibration evaluating apparatus, is provided within the handle portion 2 of the angle grinder 1 as described above. The vibration transmitted to the handle portion 2 from the drive mechanism accommodating portion 3 is, first, detected by the three-axis vibration acceleration pickup (vibration detecting means) 13. The three-axis vibration acceleration pickup 13, where the load proportional to the added acceleration is adapted to be generated with a piezo-electric element, can measure at the same time the vibration acceleration in three-axis (x, y and z) direction orthogonal to each other. A signal detected by the three-axis vibration acceleration pickup 13 is inputted to an amplifier 17 and is amplified, and then is further inputted to an anti-aliasing filter 18. The anti-aliasing filter 18, preventing folding up noises in the A/D conversion from being caused, is a low-pass filter which makes approximately one half frequency, of the sampling frequency in the A/D conversion, a cut-off frequency. The signal filtered by the anti-aliasing filter 18 is inputted to the A/D converter 19. The A/D converter 19 converts the inputted analog signals into the digital signals of 16 bits with the sampling frequency between approximately 4 KHz through 5 KHz. An amplifier 17, an anti-aliasing filter 18 and an A/D converter 19 are composed of 3 channels corresponding to each signal of the x, y and z directions outputted from the three-axis vibration acceleration pickup 13. Three types of vibration acceleration amplifying signals corresponding to each direction of the x, y and z are outputted as the digital signals from the A/D converter 19. These digital signals are inputted to all the microcomputers 20, and are analyzed and processed by this microcomputer 20 functioning as an analyzing means. Then, the results are fed to a displaying portion (displaying means) 11, so as to effect the displaying operation.

Figure 5:
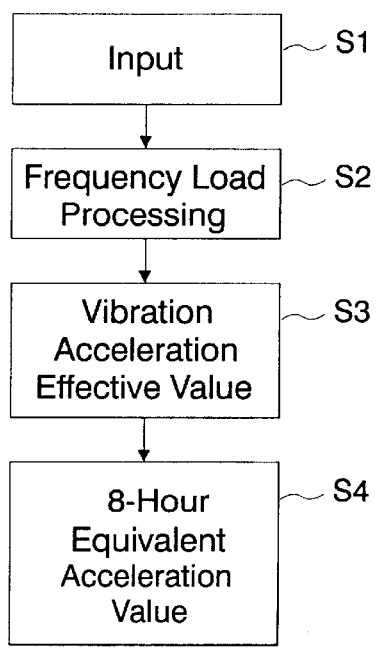
FIG. 5 is a flow chart showing the analyzing procedure to be conducted by the microcomputer.
Figure 6:
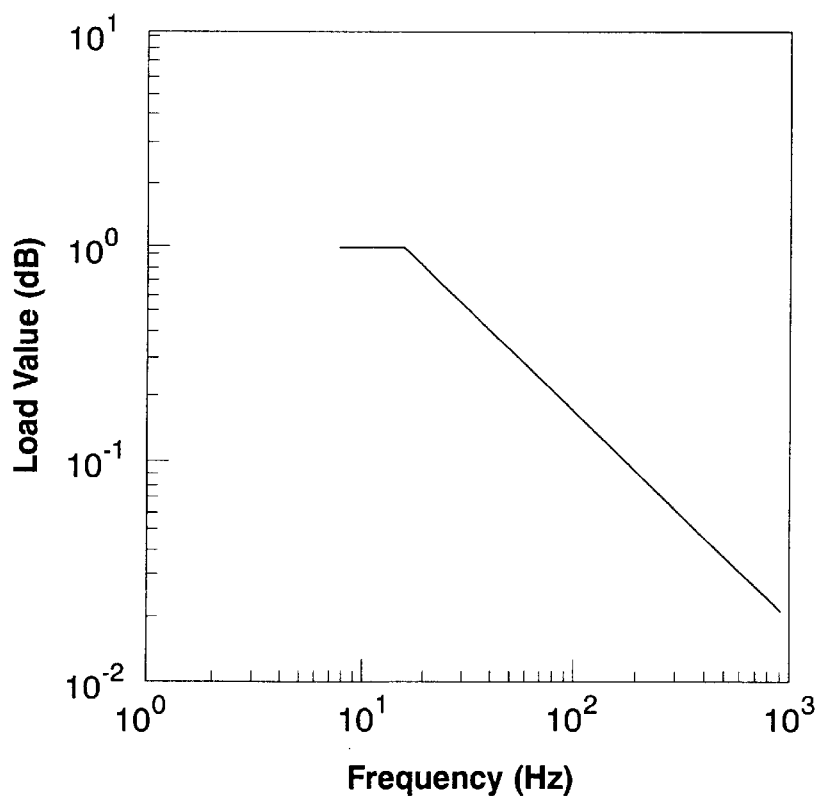
FIG. 6 is a frequency characteristic graph of the digital filter composed by the microcomputer.

FIG. 5 is a flow chart for illustrating the analyzing procedure by the microcomputer 20. At a step S1, the digital signal is inputted through an input interface. At a step S2, a frequency load processing operation is conducted to the inputted digital signal. This frequency load processing operation, composing concretely a digital filter having the frequency characteristics based on the norm of such ISO5349 as shown in FIG. 6 by the microcomputer 20, conducts filtering by this digital filter. The respective signals obtained by such frequency load processing are $Xx(i)$, $Xy(i)$, and $Xz(i)$. At the next step S3, the frequency load vibration accelerator effective value $ah_{WX}$ in the operation continuous time T is obtained. Thus, the frequency load vibration acceleration effective value $ah_{WX}$, $ah_{WY}$ and $ah_{WZ}$ for each shaft are obtained. When this is explained concretely, represented by $Xx(i)$, the next equation:

$$ah_{WX} = \left[ \frac{1}{N} \cdot \sum_{i=1}^{N} Xx^2(i) \right]^{1/2} \quad \text{(I)}$$

is calculated. Here N is the total sampling number of the time T. From these values obtained for each axes, the frequency load vibration acceleration effective value $ah_W$ with three axes being totaled is obtained by the following equation:

$$ah_{WX} = (ah_{wx}^2 + ah_{wy}^2 + ah_{wz}^2)^{1/2} \quad \text{(II)}$$

At the step S4, the 8-hour equivalent acceleration value $ah_{W(eq \cdot 8h)}$ is calculated by using the frequency load vibration acceleration effective value $ah_W$. Concretely, the next equation:

$$ah_{W(eq \cdot 8h)} = ah_W [T/T(8)]^{1/2} \quad \text{(III)}$$

is calculated. Here the T(8) means 8 hours.

Figure 4:
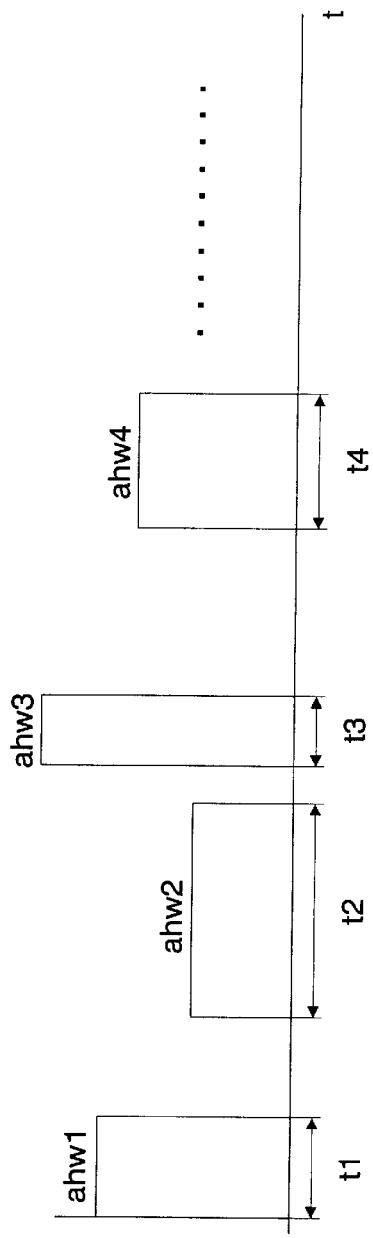
FIG. 4 is an illustrating view showing the calculating situation of the frequency load vibration acceleration effective value conducted by the microcomputer composed of the human body vibration evaluating apparatus.

In the norm of the ISO5349, and the guideline of the Japanese Industry Sanitation Society, the operation standard is determined based on the 8-hour equivalent acceleration value $ah_{W(eq \cdot 8h)}$. When the 8-hour equivalent acceleration value $ah_{W(eq \cdot 8h)}$ is operated to become 2.5 (ISO5349) or 2.26 (Japanese Industry Sanitation Society GuideLine) or lower, the breaking out of the vibration disease in 8 through 10 years can be controlled in 10% or lower. When the operation continues for the time period t1 as shown in FIG. 4, i.e., the vibrations detected by the three-axis vibration acceleration pickup 13 are ceased, the microcomputer 20 calculates the frequency load vibration acceleration effective value $ah_{W1}$ about the vibrations of the time period t1 by the analyzing procedure, and further, the 8-hour equivalent acceleration value $ah_{W(eq \cdot 8h)}$ from the $ah_{W1}$. When the Japanese Industry Sanitation Society GuideLine is followed, the limit time t=tg where the 8-hour equivalent acceleration value $ah_{W(eq \cdot 8h)}$ becomes 2.26 when the similar operation continues from the following equation, $$ah_{W(eq \cdot 8h)} = ah_{W1}(t/T(8))^{1/2} \leq 2.26 \qquad (IV)$$

Figure 7:
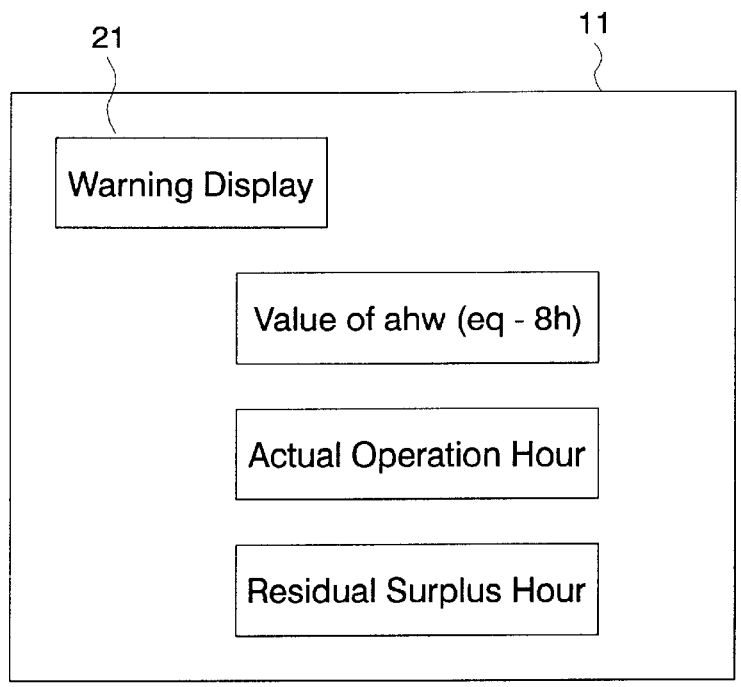
FIG. 7 is a model plan view showing the display portion for composing the human body vibration evaluating apparatus.

By subtraction of the operation time t1 from the obtained limit time tg, the remaining surplus time tp1 can be obtained. Namely, even if the similar operation is continued later by time tp1 in that day, the breaking out probability of the vibration disease after 8 through 10 years can be controlled to 10% or lower. On the displaying portion 11 are displayed, as shown in FIG. 7, the value of the 8-hour equivalent acceleration value $ah_{W(eq \cdot 8h)}$, and the operation time t1 up to the present time point, and the residual surplus time tp1.

When the operation is conducted during the time t2, and is finished, as shown in FIG. 4, the frequency load vibration acceleration effective value $ah_{W2}$ is calculated about the vibration for this time t2 in accordance with the analyzing procedure. By using the $ah_{W2}$ and the $ah_{w1}$, the 8-hour equivalent acceleration value $ah_{W(eq \cdot 8h)}$ at the operation completion time is calculated by the following equation, $$ah_{W(eq \cdot 8h)} = ah_{W1}(t_1/T(8))^{1/2} + ah_{W2}(t_2/T(8))^{1/2} \qquad (V)$$

The 8-hour equivalent acceleration value $ah_{W(eq \cdot 8h)}$ about the operation for the time t1, the 8-hour equivalent acceleration value $ah_{W(eq \cdot 8h)}$ about the operation for the time t2 are added accumulatively. Considering that the same operation as the operation of this time t2 is conducted continuously, the limit time t=tg which becomes $ah_{W(eq \cdot 8h)} = 2.26$ from the following equation, $$ah_{W(eq \cdot 8h)} = ah_{W2}(t/T(8))^{1/2} \leq 2.26 \qquad (VI)$$

By subtracting the total operation time t1+t2 from the limit time tg, the residual surplus time tp2. These results are displayed on the displaying portion 11 in the same manner as described above. The procedure is repeated each time the operation is continued for hours t3 and t4. When the residual surplus time tpi is lowered than a specified value of, for example, approximately 30 minutes, the specified warning display is conducted on the warning displaying portion 21 provided on the displaying portion 11.

A holding vibration tool composed and operated as described above, composing a vibration acceleration pickup 13 for detecting the vibrations, a microcomputer 20 for calculating the 8-hour equivalent acceleration value $ah_{W(eq \cdot 8h)}$ as the vibration exposure amount under the detected signal, and a human body vibration evaluating apparatus having a displaying portion 11 for displaying it. The human body vibration evaluating apparatus calculates the 8-hour equivalent acceleration value $ah_{W(eq \cdot 8h)}$ about the operation each time the continued operation is interrupted, and obtains the total 8-hour equivalent acceleration value $ah_{W(eq \cdot 8h)}$ by the accumulating addition within one day. Even if the actual operation as changed variably in the operation contents, the operator himself can know correctly how much vibration to which he has been exposed. Thus, the body of the operator can be positively protected. Each time the continuous operation is interrupted, the 8-hour equivalent acceleration value $ah_{W(eq \cdot 8h)}$ can be grasped with the same operation as the operation conducted immediately before being continued, and the residual surplus time tpi from the 8-hour equivalent acceleration value $ah_{W(eq \cdot 8h)}$ can be obtained and displayed. Thus, the residual surplus time tpi even in the actual operation as variably changed in the operation contents can be obtained correctly, thereby the body of the tool user can be protected reliably.

A three-axis vibration acceleration speed pickup 13, a battery 14, a control substrate 12 and a display portion 11 are provided within the handle portion 2. Thus, the correct vibration can be detected with the three-axis vibration acceleration pickup 13, and the tool can be made compacter by effectively using the portion which is conventionally empty in space.

Although the concrete embodiment of this invention is described, the invention can be variably embodied within the range of this invention without any restriction in the embodiment. Although the residual surplus time tpi is obtained from the $ah_{W(eq \cdot 8h)} \leq 2.26$ along the guideline of the Japanese Industry Sanitation Society in the above description, the residual surplus time tpi can be obtained from the $ah_{W(eq \cdot 8h)} \leq 2.5$ along the norm of the ISO5349, and further the residual surplus time tpi can be obtained from the value of $ah_{W(eq \cdot 8h)} \leq 2.0$ or the like by seeing the surplus. As the layout of the displaying portion 11 shown in FIG. 7 and the displaying contents are one example, the invention can be variably changed. A human body vibration evaluating apparatus which is mounted in an angle grinder 1 is described as one example of the holding vibration total in the above description. This invention can be applied to the various holding vibration tools such as impact wrench, ratchet wrench, driver, another type of grinder, hammer, chain saw and so on, thus obtaining excellent effects.

Figure 8:
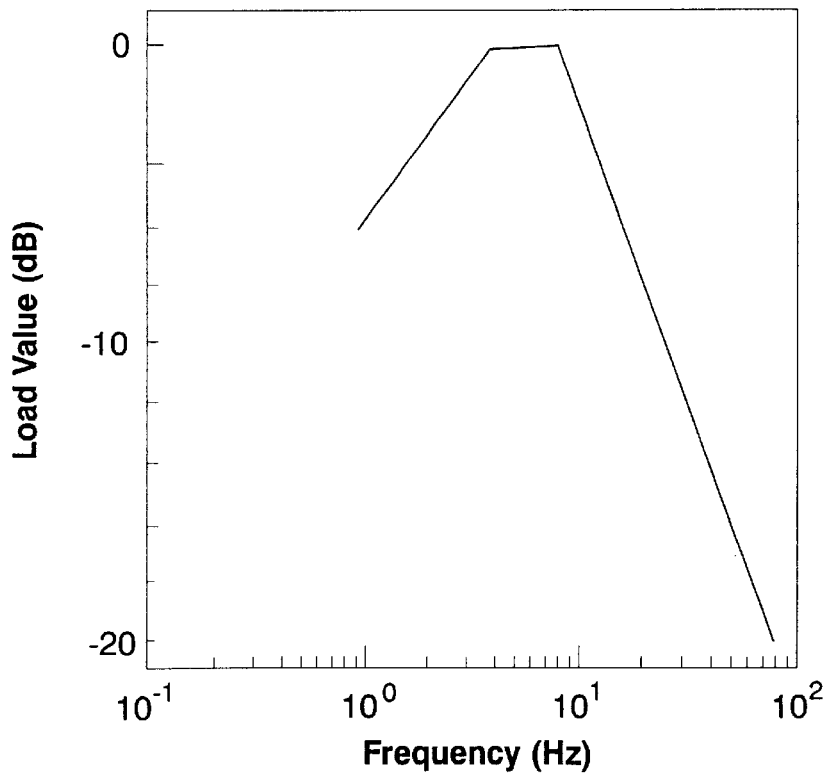
FIG. 8 is a frequency characteristic graph of a digital filter composed by a microcomputer of the human body vibration evaluating apparatus provided in an automobile or the like where the whole vibrations become a problem.

A human body vibration evaluating apparatus of this invention can be mounted on an apparatus in general such as automobiles which gives vibrations to the human body. In the case of the holding vibration tool are hand and arm vibrations as a problem, but in the case of the automobile, bike, electric train and so on are the whole body vibrations as a problem. About the whole body vibrations is defined a norm in the ISO2631. In this case, the digital filter for conducting the frequency load processing is provided with frequency characteristics as shown in FIG. 8, and the residual surplus time tpi using the limit time t when the 8-hour equivalent acceleration value $ah_{W(eq \cdot 8h)}$ calculated in the procedure the same as the above description becomes approximately 0.5. The three-axis vibration acceleration pickup 13, the control substrate 12, the displaying portion 11, the battery 14 (can be provided in advance) and so on can be provided in the automobile and so on. At this time, when the three-axis vibration acceleration pickup 13 is provided in the seat of the vehicle, the vibrations can be correctly detected. The 8-hour equivalent acceleration value $ah_{W(eq \cdot 8h)}$, and the residual surplus time tpi can be calculated, and displayed by the same procedure as in the case where the three-axis vibration acceleration pickup 13 is provided in the handle of the automobile, the bike and so on, as in the case where it is mounted in the holding vibration tool.

SUMMARY

Within the handle portion 2 of the holding vibration tool such as angle grinder 1 or the like are a three-axis vibration acceleration pickup 13, an A/D converter 19, a microcomputer 20, a display portion 11 and so on. Each time the continuous operation is interrupted, an 8-hour equivalent acceleration value $ah_{W(eq \cdot 8h)}$ is obtained based on the detected vibration acceleration signal so as to accumulatively add it in one day. Each time the continuous operation is interrupted, a frequency load vibration acceleration value a is obtained, and an 8-hour equivalent acceleration value $ah_{W(eq \cdot 8h)}$ is obtained based on this. Further, the residual surplus time t is obtained and displayed by using the 8-hour equivalent acceleration value $ah_{W(eq \cdot 8h)}$.

What is claimed is:

1. A human body vibration evaluating apparatus comprising:

a vibration detecting means for detecting vibrations applied from an external source to a human body;

an analyzing means for analyzing on signals detected by said vibration detecting means;

a displaying means for displaying based on analyzing results from said analyzing means;

said analyzing means taking an 8-hour equivalent acceleration value about said vibrations detected continuously each time said vibrations are interrupted; and said total 8-hour equivalent acceleration value up to a present time point being determined by accumulatively adding said 8-hour equivalent acceleration value in one day.

2. A human body vibration evaluating apparatus of claim 1, wherein: said human body vibration evaluation apparatus is mounted in a holding vibration apparatus for giving vibrations to said human body.

3. A holding vibration tool provided with a human body vibration evaluating apparatus of claim 2.

4. A holding vibration tool of claim 2, where said vibration detecting means is disposed in a handle of said tool.

5. A human body vibration evaluating apparatus comprising:

a vibration detecting means for detecting said vibrations applied from an external source to said human body;

an analyzing means for analyzing based on signals detected by said vibration detecting means;

a displaying means for displaying based on analyzing results taken by said analyzing means;

said analyzing means taking a frequency load vibration acceleration effective value about said vibrations detected continuously each time said vibrations are interrupted;

a limit time (tg) where an 8-hour equivalent acceleration value forming a prescribed reference value when said vibration is to continue using said frequency load vibration acceleration effective value;

a residual surplus time (tp) calculated by subtracting said total time, where said vibration is detected by said vibration detecting means up to said present time point in one day, from said limit time (tg).

6. A human body vibration evaluating apparatus of claim 5, wherein: said human body vibration evaluating apparatus is mounted in a holding vibration apparatus for giving vibrations to said human body.

7. A holding vibration tool of claim 6, where said human body vibration evaluating apparatus is disposed in a handle portion of said tool.

* * * * *

UNITED STATES PATENT AND TRADEMARK OFFICE
CERTIFICATE OF CORRECTION

PATENT NO. : 6,490,930 B1
DATED : December 10, 2002
INVENTOR(S) : Masaaki Ohkubo et al.

It is certified that error appears in the above-identified patent and that said Letters Patent is hereby corrected as shown below:

<u>Title page,</u>
Item [87], PCT Pub. No.:, "WO00/31505" should be -- WO00/31507 --

Signed and Sealed this

Twenty-second Day of July, 2003

JAMES E. ROGAN
*Director of the United States Patent and Trademark Office*